United States Patent [19]

Ho et al.

[11] Patent Number: 4,794,156

[45] Date of Patent: Dec. 27, 1988

[54] TWO STAGE CATALYTIC PRODUCTION OF HIGH MOLECULAR WEIGHT POLYHALOBISPHENOL POLYCARBONATES

[75] Inventors: Thoi H. Ho; Frederick B. Kassell; Che I. Kao, all of Lake Jackson; Jose L. Aguilar, Richwood, all of Tex.

[73] Assignee: The Dow Chemical Company, Midland, Mich.

[21] Appl. No.: 81,418

[22] Filed: Aug. 4, 1987

[51] Int. Cl.$^4$ .............................. C08G 63/62
[52] U.S. Cl. ................... 528/199; 528/125; 528/126; 528/171; 528/174; 528/196; 528/202; 528/204
[58] Field of Search ............... 528/199, 202, 125, 126, 528/171, 174

[56] References Cited

U.S. PATENT DOCUMENTS

| | | | |
|---|---|---|---|
| 2,970,131 | 1/1961 | Moyer, Jr. et al. | 260/47 |
| 3,207,777 | 9/1965 | Szobel | 528/202 |
| 3,248,366 | 4/1966 | Schmitt et al. | 528/202 |
| 3,428,600 | 2/1969 | Sullivan et al. | 528/199 |
| 3,912,687 | 10/1975 | Haupt et al. | 260/47 X |
| 4,180,651 | 12/1979 | Mark | 528/202 |
| 4,195,157 | 3/1980 | Mark | 528/202 |
| 4,224,434 | 9/1980 | Quinn et al. | 528/202 |
| 4,262,113 | 4/1981 | Jaquiss et al. | 528/199 |
| 4,286,085 | 8/1981 | Jaquiss et al. | 528/199 |
| 4,286,086 | 8/1981 | Mark | 528/199 |
| 4,291,151 | 9/1981 | Mark | 528/199 |

Primary Examiner—Harold D. Anderson
Attorney, Agent, or Firm—B. G. Colley

[57] ABSTRACT

High molecular weight polyhalobisphenol polycarbonates are produced by adding phosgene to a polyhalobisphenol in the alkali metal phenate form whereby the chloroformates of the bisphenol are formed and then adding an activated pyridine such as 4-aminopyridines or 2-substituted pyridines to generate a high molecular weight polycarbonate having an inherent viscosity in the range from about 0.4 to about 0.9.

19 Claims, No Drawings

TWO STAGE CATALYTIC PRODUCTION OF HIGH MOLECULAR WEIGHT POLYHALOBISPHENOL POLYCARBONATES

BACKGROUND OF THE INVENTION

This invention relates to an improved interfacial process for the production of high molecular weight polyhalobisphenol polycarbonates using activated pyridine catalysts.

It is known from U.S. Pat. No. 3,912,687 that tetrahalobisphenols have a reduced reactivity due to steric hindrance and low pK values and that the preparation of polycarbonate resins from these phenols using the interfacial technique can be accomplished with relatively large amounts of trialkylamine catalysts and a two stage reactor. However, it has been found that this process gives low molecular weight resins.

It is also known from U.S. Pat. No. 4,286,085 and U.S. Pat. No. 3,530,094 that substituted pyridine catalysts can be used to make high molecular weight polycarbonates from bisphenol A. However, U.S. Pat. No. 4,286,085 teaches the addition of the catalyst before the phosgenation step and this does not give high molecular weight polycarbonates when tetrahalobisphenols are used.

Other patents such as U.S. Pat. Nos. 2,970,131; 4,262,113; 4,286,086; and 4,291,151 generally teach the preparation of high molecular weight polycarbonates from tetrahalobisphenols but they do not have examples of the use of these hindered phenols for support. These known procedures adaptable to the preparation of high molecular weight bisphenol-A polycarbonate (U.S. Pat. No. 4,286,085, U.S. Pat. No. 2,970,131, U.S. Pat. No. 4,262,113, U.S. Pat. No. 4,286,086, U.S. Pat. No. 4,291,151) are not satisfactory for preparing high molecular weight of polycarbonate (PC) from the hindered halobisphenols. The tetrabromobisphenol-A polycarbonates (TBBA-PC) prepared using these known procedures has inherent viscosity less than 0.3 (42,000 weight average molecular weight). The polymer obtained is brittle (see Controls 1–5). U.S. Pat. No. 3,912,687 describes the details of preparation of TBBA-PC. The highest molecular weight reported is 50,000. The polymer has relative viscosity of 1.18 or inherent viscosity of 0.33.

Generally, to possess a useful ductility the polycarbonates must have a molecular weight higher than a critical molecular weight. It is found that the critical weight average molecular weight of TBBA-PC is about 60,000 which corresponds to the inherent viscosity of 0.4 or the degree of polymerization of about 35. For example, for applications such as solvent cast film or solution spinning fiber, the polycarbonate must have inherent viscosity above 0.4 so that tough film or fiber can be prepared.

SUMMARY OF THE INVENTION

The present invention is directed to a process wherein high molecular weight polyhalobisphenol polycarbonates are prepared using activated pyridine catalysts. The resultant resins having a inherent viscosity greater than about 0.4 and preferably in the range from 0.4 to 0.9 are useful fire retardant polycarbonates. The resins have high glass transition temperature ($Tg=265°$ C. for the polycarbonate made from tetrabromobisphenol A), good solvent resistance and good hydrolytic stability. Tough film or fiber can be prepared from the polymer. The resins prepared from tetrabromobisphenol A are also useful to prepare hollow fibers for gas separations.

The process of this invention has the following steps:

(A) mixing a polyhalobisphenol, a halogenated solvent, and sufficient aqueous alkali metal hydroxide to obtain a mixture having said bisphenol in the alkali metal form, (B) adding phosgene to said mixture and additional aqueous hydroxide whereby the pH of said mixture is maintained in the range from about 8 to about 13 whereby a mixture of bischloroformate and monochloroformate from the bisphenol are formed, (C) adding a catalytic amount of a activated pyridine selected from the group consisting of 4-aminopyridines and 2-substituted pyridines and additional aqueous hydroxide whereby said pH is maintained, and (D) recovering said high molecular weight polycarbonate.

DETAILED DESCRIPTION OF THE INVENTION

These polyhalobisphenols are well known from U.S. Pat. No. 3,912,687. They include aromatic dihydroxy compounds of the general formula

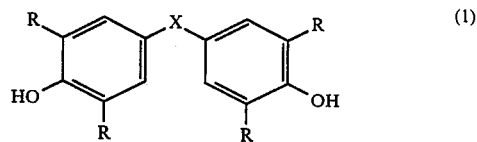

in which R is chlorine, bromine, or mixtures thereof, and X is $C_1$–$C_6$ alkylene, cycloalkylene, a single bond, —O—, —S—, —SO—, —SO$_2$—, —CO— or

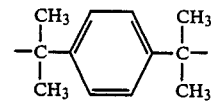

They also include 2,2-bis(4-hydroxy-3-bromophenyl)propane, 2,2-bis(4-hydroxy-3-chlorophenyl)propane, 2,2-bis(4-hydroxy-2,3,5,6-tetrabromophenyl)propane, 2,2-bis(4-hydroxy-2,3,5,6-tetrachlorophenyl)propane.

The catalysts used in this invention are activated pyridines or their salts having electron donor substituents such as alkyl or dialkylamino groups.

The preferred activated pyridines are 4-aminopyridines of general formula (2):

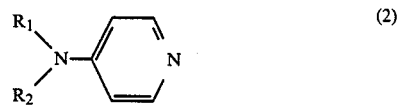

in which $R_1$, $R_2$ are alkyl and can be bridges to form cycloalkylene groups. $R_1$ and $R_2$ can also represent a polymer chain.

The dialkylamino group or related group activates the pyridine by donating electron to N in the ring by a resonance effect as shown by Agnew, Chem. Int. Ed. Engl., 17, 569 (1978), G. Höfle, W. Steglich and H. Vorbrüggen:

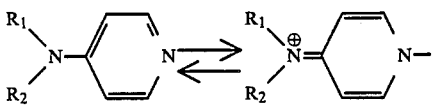

Examples of 4-dialkylaminopyridines are: 4-dimethylaminopyridine, 4-pyrrolidinopyridine

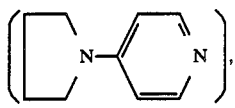

poly(N,N-dialkylaminopyridine)

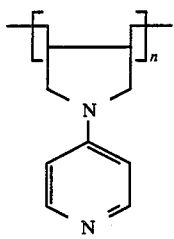

as shown by L. J. Mathias, R. V. Vaidyn and R. M. Bloodworth, Polymer Preprints, 26(2), 182 (1985).

The preferred activated pyridines are 2-substituted pyridines of general formula (3)

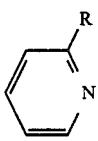
(3)

where R is alkyl, cycloalkyl, or a polymer chain. The group in the 2 position activates the pyridine by donating electron to N in the ring by inductive effects.

Examples of the 2-substituted pyridines are: methyl, ethyl, methyl, isopropyl or polyvinyl pyridine having the formula

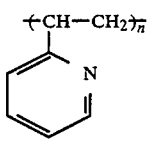

The activated pyridines of formulas (2) and (3) with additional alkyl groups can also be used:

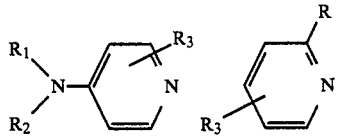

where $R_3$ are alkyl groups.

The amount of catalyst used varies according to the specific bisphenol used and the reaction temperature. In general, an effective or a catalytic amount of the catalyst is in the range from about 0.02 to about 10 mole percent based on the moles of the bisphenol used. A preferred range is 0.05 to 5 mole percent.

The temperature of the reaction is generally kept in the range from about 20° C. to about 50°. However, temperatures over or under this can be used if desired.

Examples of useful halogenated solvents are chlorobenzene, chloroform, carbon tetrachloride, 1,2-dichloroethane, methylene chloride, 1,1,2-trichloroethane, tetrachloroethane, and mixtures thereof.

Normally, about 1.5–2 moles of phosgene will be used per mole of bisphenol in this reaction. A slight excess of phosgene is used in order to achieve complete reaction.

The pH of the reaction mixture is maintained in the range from about 8 to about 13 depending on the bisphenol used and preferably in the range from 9 to 11.

The high molecular weight polyhalobisphenol polycarbonate produced in accordance with the practice of this invention include carbonate homopolymer of polyhalobisphenol or carbonate copolymers of two or more different polyhalobisphenols with bisphenol A. Additionally, the production of high molecular weight randomly branched polyhalobisphenol carbonate and copolyester-polycarbonate are included within the scope of this invention.

The weight average molecular weight (Mw) and number average molecular weight (Mn) of the polycarbonate from hindered bisphenols were measured by size exclusion chromatography using polycarbonate from bisphenol A as a standard. The inherent viscosity of the polycarbonate was measured in methylene chloride at 25° C. with concentration at 5 gms/l. An emperical relationship between Mw and inherent viscosity for TBBA-PC was obtained as follows:

$$Mw = 327000 \times \eta^{1.7}$$

The degree of polymerization was calculated by dividing Mn by the weight of a repeating unit (569.8 for TBBA-PC). The inherent viscosity ($\eta$) is calculated from the relative viscosity using the following equation:

$$\text{Inherent Viscosity} = \frac{\ln \eta_{rel}}{0.5}$$

The following examples and controls are presented to further illustrate the invention.

CONTROL I

This control illustrates an unsuccessful attempt to prepare high molecular weight TBBA-PC using benzyltrimethyl ammonium chloride as a catalyst. Benzyltrimethyl ammonium chloride is described as an effective catalyst for producing high molecular weight bisphenol A polycarbonate in U.S. Pat. No. 2,970,131.

The reactor was charged with tetrabromobisphenol-A (TBBA) (205 g, 0.377 mole) methylene chloride (2000 ml) and water (1000 ml). Nitrogen was purged through the reaction mixture for 10 minutes. Benzyltrimethyl ammonium chloride (2.3 g, 0.0123 mole) was added to the reaction mixture. The caustic feed reservoir was charged with 120 g of 50% NaOH. Phosgene (50 g, 0.51 mole) was introduced into the reaction mixture in 30 minutes maintaining the reaction mixture at pH 10 by pumping caustic from the reservoir. After adding the phosgene, the pH of the mixture was raised to 12.5 and stirring continued for 30 minutes. An extra amount of phosgene (ca 10 g) was used to adjust the pH of the reaction mixture to 7. The organic layer was washed three times with water. Molecular weight analysis of the organic layer indicated that only low molecular weight TBBA-PC was obtained (Mw<10,000). This control demonstrates that a catalyst for bisphenol A polycarbonate may not necessarily be a catalyst for TBBA polycarbonate.

CONTROL II

This control illustrates another unsuccessful attempt to prepare high molecular weight TBBA-PC with triethylamine as a catalyst using a conventional process of making high molecular weight polymer from bisphenol A (U.S. Pat. No. 3,275,601).

The reactor was charged with TBBA (205 g, 0.377 mole) methylene chloride (2000 ml) and water (1000 ml). Nitrogen was purged through the reaction mixture for 10 minutes. The caustic reservoir was charged with 120 g of 50% NaOH. Phosgene (50 g, 0.510 mole) was introduced into the reaction mixture in 30 minutes keeping the reaction solution at pH 10 by pumping the caustic from the reservoir. After adding the phosgene, the pH of the mixture was raised to 12.5 and 2 ml of TEA was added. The reaction was stirred for 1 hour. Phosgene was added to bring the reaction mixture to pH 7. The organic layer was washed three times with water. Molecular weight analysis of the organic layer indicated that only low molecular weight of TBBA-PC was obtained (Mw<10,000).

CONTROL III

Using the same conditions as Control II, bisphenol A gave a high molecular weight (100,000 Mw) polycarbonate. A comparison of Controls II and III shows that while bisphenol A can be readily converted into a high molecular weight polycarbonate, the same conditions using tetrabromobisphenol A results in a low molecular weight polymer.

CONTROL IV

This control illustrates an attempt to prepare high molecular weight TBBA-PC using dimethylaminopyridine (DMAP) as a catalyst under the similar conditions that U.S. Pat. No. 4,286,085 claims to produce high molecular weight PC from bisphenol A.

To the reactor was charged TBBA (543.9 g, 1.0 moles), methylene chloride (1300 g), water (228 g), DMAP (1.63 g, 0.0133 mole), and 15% NaOH (624 g, 2.34 moles). Phosgene (104 g, 1.061 moles) was then added to the reaction in 30 minutes while keeping pH 9 by adding 15% NaOH. After 30 minutes, additional sodium hydroxide was added to adjust the reaction mixture to pH 11. Molecular weight analysis of the organic layer indicated that low molecular weight TBBA-PC was obtained (35,000 Mw). The inherent viscosity of the polycarbonate was 0.25.

CONTROL V

This example illustrates an unsuccessful attempt to prepare high molecular weight TBBA-PC using TEA as a catalyst similar to the process described in U.S. Pat. No. 3,912,687.

The reactor was charged with TBBA (409.5 g, 0.753 mole) methylene chloride (2000 ml), water (1000 ml) and TEA (2.7 g, 0.027 mole). Phosgene (93 g, 0.949 mole) was introduced into the reaction mixture in 30 minutes keeping the pH of the solution at 9-10 by adding 50% caustic (180 g, 2.25 mole). After adding the phosgene a second portion of methylene chloride (1000 ml) was added and the pH was raised to 12. The mixture was stirred for two hours. More phosgene was added to adjust the mixture to pH 7. The organic phase was washed three times with water. After evaporation of the solvent TBBA-PC having a weight average molecular weight of 37,000 was obtained. The polymer has a relative viscosity of 1.13. The reported value of relative viscosity of TBBA polymer in U.S. Pat. No. 3,912,607 was 1.18 or Mw=50,000. Several duplicate runs were made. The molecular weight of the polymer obtained was not very reproducible and varied from 30,000-50,000. The relative viscosity of 1.18 corresponds to the inherent viscosity of 0.33.

EXAMPLE 1

A five-necked round bottom flask fitted with a pH electrode, subsurface gas inlet tube, thermometer, caustic inlet port, and electric paddle stirrer and set in an ice water bath is purged with nitrogen. Tetrabromobisphenol A (409.5 g, 0.753 mole) is charged to the reactor followed by methylene chloride (1000 ml), water (1500 ml), and phenol (0.5 g, 0.0053 mole). The mixture is adjusted to pH 10 by adding 50% caustic (119.5 g, 1.494 moles). The reaction temperature was 25±3° C. Phosgene (110 g, 1.11 moles) was introduced into the reaction mixture in 30 minutes while maintaining pH 10 by adding caustic (15 g, 0.187 mole). A sample of the reaction mixture was analyzed and found to have about 70% by weight of the bischloroformate of TBBA and 30% by weight of the monochloroformate of TBBA.

The reaction mixture was diluted with methylene chloride (2000 ml). Dimethylaminopyridine (0.2 g in 10 ml $CH_2Cl_2$) was added to the reaction mixture. The reaction mixture was stirred for 30 minutes while adding caustic (118 g, 1.475 moles) to keep the pH at 10. The caustic addition was stopped and phosgene (10 g, 0.1 mole) was added to bring the pH to 7. The organic layer was washed three times with water. A film obtained from the washed polymer solution had a weight average molecular weight of 140,000. The polycarbonate obtained had an inherent viscosity of 0.60.

EXAMPLE 2

The procedure of example 1 was repeated without using phenol as a terminator. The result was a TBBA polycarbonate with a weight average molecular weight of 240,000 and an inherent viscosity of 0.85.

EXAMPLE 3

A five-necked round bottom flask fitted with a pH electrode, subsurface gas inlet tube, thermometer, caustic inlet port, and electric paddle stirrer and set in an ice water bath is purged with nitrogen. Tetrachlorobisphenol A (146.4 g, 0.4 mole) is charged to the reactor followed by methylene chloride (325 ml), and water (480 ml). The mixture is adjusted to pH 10 by adding 50% caustic solution. The reaction temperature was 25±3° C. Phosgene (80 g, 0.81 mole) was introduced into the reaction mixture in 30 minutes while maintaining pH 10 by adding 50% caustic solution. At this stage all tetrachlorobisphenol A has reacted. The reaction mixture was diluted with methylene chloride (300 ml). Dimethylaminopyridine (0.21 g, 0.00172 mole) was added to the reaction mixture. The reaction mixture was stirred for 30 minutes while adding caustic to keep the pH at 10. The caustic addition was stopped and phosgene (5 g, 0.05 mole) was added to bring the pH to 7. Total 50 wt% caustic used was 270–300 g (or 3.4–3.75 moles). The organic layer was washed three times with water. A film obtained from the washed polymer solution had a weight average molecular weight of 250,000 or an inherent viscosity of 0.90.

EXAMPLES 4–5

The procedure of Example 2 was repeated using 2.8 gms of 2-picoline and 2-propyl pyridine, respectively to obtain high molecular weight polycarbonates. The results are set forth in the table.

CONTROL VI

The procedure of Example 2 was repeated using 2.8 grams of 4-picoline. The results are set forth in the table.

EXAMPLES 6–7

The procedure of Example 1 was repeated using 0.32 and 0.91 grams of phenol, respectively. The results are set forth in the table.

TABLE

| Experiments | Dihydric Phenol | Catalyst | Mole % Catalyst |
|---|---|---|---|
| CNTR I | TBBA | BTMAC | 3.26 |
| CNTR II | TBBA | TEA | 3.81 |
| CNTR III | BIS-A | TEA | 3.81 |
| CNTR IV | TBBA | DMAP | 1.33 |
| CNTR V | TBBA | TEA | 3.54 |
| CNTR VI | TBBA | 4-P | 3.99 |
| EX 1 | " | DMAP | 0.22 |
| EX 2 | " | " | ". |
| EX 3 | TCBA | " | 0.43 |
| EX 4 | TBBA | 2-P | 3.99 |
| EX 5 | " | 2-PP | 3.07 |
| EX 6 | " | DMAP | 0.22 |
| EX 7 | " | " | " |

| Experiments | Mw | Mole Ratio Phenol/TBBA | INH. Visc. |
|---|---|---|---|
| CNTR I | <10,000 | NONE | N.A. |
| CNTR II | " | " | " |
| CNTR III | 100,000 | " | " |
| CNTR IV | 35,000 | " | 0.25 |
| CNTR V | 37,000–50,000 | NONE | 0.26–0.36 |
| CNTR VI | 59,000 | NONE | 0.35 |
| EX 1 | 140,000 | .0070 | 0.60 |
| EX 2 | 240,000 | NONE | 0.85 |
| EX 3 | 250,000 | " | 0.90 |
| EX 4 | 100,500 | " | 0.45 |
| EX 5 | 200,000 | " | 0.80 |
| EX 6 | 190,000 | .0045 | 0.75 |
| EX 7 | 84,000 | .0127 | 0.45 |

TBBA is tetrabromobisphenol A
BTMAC is benzyltrimethyl ammonium chloride
TCBA is tetrachlorobisphenol A
2-P is 2-picoline
BIS-A is bisphenol A
2-PP is 2-propylpyridine
TEA is triethylamine
4-P is 4-picoline
DMAP is dimethylaminopyridine
% catalyst is based on the moles of dihydric phenol The following conclusions can be drawn from the facts set forth in the above table. The results from Controls I–IV indicate that the known procedure for preparing high molecular weight bisphenol A PC are not satisfactory for making high molecular weight TBBA-PC. The results of Control V indicate that the teaching in U.S. Pat. No. 3,912,687 gives low molecular weight polycarbonates. The maximum molecular weight obtained was Mw=50,000 (inherent viscosity=0.35) even though no terminator was used. The results in Examples 2 and 3 indicate that the process of this invention gives a high molecular weight product. Examples 1, 2, 6 and 7 indicate that the process of this invention allows one to prepare controlled molecular weight polycarbonate from TBBA. The results of Experiments 2, 4 and 5 indicate that activated pyridines with the general structures (2) and (3) on pages 4 and 6 above are required to obtain the desired high molecular weights. The substituted pyridines such as 4-methylpyridine which does not have the general structures gives only low molecular weight.

We claim:

1. A process for the production of high molecular weight polyhalobisphenol polycarbonates having an inherent viscosity range greater than 0.4 when measured in methylene chloride at 25° C. with a concentration of 5 gms per liter which consists essentially of the steps of (A) mixing a polyhalobisphenol of the general formula

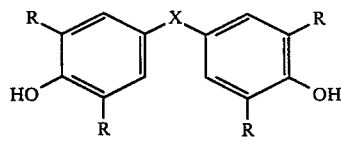

in which R is chlorine, bromine, or mixtures thereof, and X is a single bond or X is $C_1$–$C_6$ alkylene, cycloalkylene, —O—, —S—, —SO—, —$SO_2$—, —CO— or

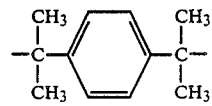

with a halogenated solvent, and sufficient aqueous alkali metal hydroxide to obtain a mixture having said bisphenol in the alkali metal form, (B) adding phosgene to said mixture and additional aqueous hydroxide whereby the pH of said mixture is maintained in the range from about 8 to about 13 and whereby mixtures of bischloroformate and monochloroformate of the bisphenols are formed, (C) adding a catalytic amount of an activated pyridine selected from the group consisting of 4-aminopyridines and 2-substituted pyridines and additional aqueous hydroxide whereby said pH is maintained and a high molecular weight polycarbonate is produced, and (D) recovering said high molecular weight polycarbonate.

2. The process as set forth in claim 1 wherein a phenolic terminator is added in step A to control the molecular weight.

3. The process as set forth in claim 1 which comprises the additional step of phosgenating said mixture containing the pyridine catalyst until the reaction is completed.

4. A process for the production of high molecular weight tetrahalobisphenol A polycarbonates having an inherent viscosity range greater than 0.4 when measured in methylene chloride at 25° C. with a concentration of 5 gms per liter which consists essentially of the steps of (A) mixing tetrahalobisphenol A, a halogenated solvent, and sufficient aqueous alkali metal hydroxide to obtain a mixture having said bisphenol in the alkali metal form, (B) adding phosgene to said mixture and additional aqueous hydroxide whereby the pH of said mixture is maintained in the range from about 8 to about 13 and whereby mixtures of bischloroformate and monochloroformate of the bisphenols are formed, (C) adding a catalytic amount of an activated pyridine having one of the general formulas

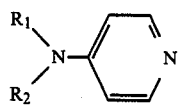

in which $R_1$, $R_2$ are alkyl groups, a polymer chain, or can be bridged to form cycloalkylene groups or

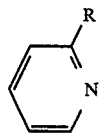

where R is an alkyl group, or an cycloalkyl group, or a polymer chain and additional aqueous hydroxide whereby said pH is maintained and a high molecular weight polycarbonate is produced, and (D) recovering said high molecular weight polycarbonate.

5. The process as set forth in claim 4 which comprises the additional step of phosgenating said mixture containing the pyridine catalyst until the reaction is completed.

6. A process for the production of high molecular weight tetrabromobisphenol A polycarbonates having an inherent viscosity range greater than 0.4 when measured in methylene chloride at 25° C. with a concentration of 5 gms per liter which consists essentially of the steps of (A) mixing tetrabromobisphenol A, a halogenated solvent, and sufficient aqueous alkali metal hydroxide to obtain a mixture having said bisphenol in the alkali metal form, (B) adding phosgene to said mixture and additional aqueous hydroxide whereby the pH of said mixture is maintained in the range from about 8 to about 13 and whereby mixtures of bischloroformate and monochloroformate of the bisphenols are formed, (C) adding a catalytic amount of an activated pyridine having one of the general formulas

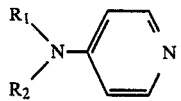

in which $R_1$, $R_2$ are alkyl groups, a polymer chain, or can be bridged to form cycloalkylene groups or

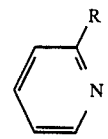

where R is an alkyl group, or an cycloalkyl group, or a polymer chain and additional aqueous hydroxide whereby said pH is maintained and a high molecular weight polycarbonate is produced, and (D) recovering said high molecular weight polycarbonate.

7. The process as set forth in claim 6 wherein a phenolic terminator is added in step A to control the molecular weight.

8. The process as set forth in claim 6 which comprises the additional step of phosgenating said mixture containing the pyridine catalyst until the reaction is completed.

9. The high molecular weight polyhalobisphenol polycarbonate produced by claim 1.

10. The high molecular weight polyhalobisphenol polycarbonate produced by claim 2.

11. The high molecular weight polyhalobisphenol polycarbonate produced by claim 3.

12. The high molecular weight polyhalobisphenol polycarbonate produced by claim 4.

13. The high molecular weight polyhalobisphenol polycarbonate produced by claim 5.

14. The high molecular weight polyhalobisphenol polycarbonate produced by claim 6.

15. The high molecular weight polyhalobisphenol polycarbonate produced by claim 7.

16. The high molecular weight polyhalobisphenol polycarbonate produced by claim 8.

17. In a process for the production of high molecular weight polyhalobisphenol polycarbonates having an inherent viscosity range greater than 0.4 when measured in methylene chloride at 25° C. with a concentration of 5 gms per liter wherein a polyhalobisphenol of the general formula

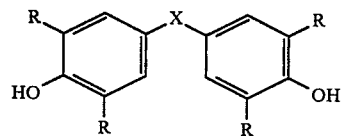

in which R is chlorine, bromine, or mixtures thereof, and X is a single bond or X is $C_1$-$C_6$ alkylene, cycloalkylene, —O—, —S—, —SO—, —SO$_2$—, —CO— or

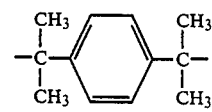

is mixed with a halogenated solvent, and sufficient aqueous alkali metal hydroxide to obtain a mixture having said bisphenol in the alkali metal form, and phosgene is added to said mixture with additional aqueous hydroxide whereby the pH of said mixture is maintained in the range from about 8 to about 13 and whereby mixtures of bischloroformate and monochloroformate of the bisphenols are formed, the improvement which comprises adding a catalytic amount of an activated pyridine selected from the group consisting of 4-aminopyridines and 2-substituted pyridines after the phosgenation step whereby a high molecular weight polycarbonate is produced.

18. In a process for the production of high molecular weight tetrahalobisphenol polycarbonates having an inherent viscosity range greater than 0.4 when measured in methylene chloride at 25° C. with a concentration of 5 gms per liter wherein a tetrahalobisphenol is mixed with a halogenated solvent, and sufficient aqueous alkali metal hydroxide to obtain a mixture having said bisphenol in the alkali metal form, and phosgene is added to said mixture with additional aqueous hydroxide whereby the pH of said mixture is maintained in the range from about 8 to about 13 and whereby mixtures of bischloroformate and monochloroformate of the bisphenols are formed, the improvement which comprises adding a catalytic amount of an activated pyridine having one of the general formulas

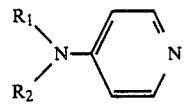

in which $R_1$, $R_2$ are alkyl groups, a polymer chain, or can be bridged to form cycloalkylene groups or

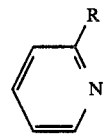

where R is an alkyl group, or an cycloalkyl group, or a polymer chain and additional aqueous hydroxide to maintain said pH and a high molecular weight polycarbonate is produced.

19. The process as set forth in claim 18 wherein the tetrahalobisphenol is tetrabromobisphenol A.

* * * * *